(12) United States Patent
Maeda et al.

(10) Patent No.: US 9,957,033 B2
(45) Date of Patent: May 1, 2018

(54) DOOR OF AIRCRAFT AND AIRCRAFT HAVING THE SAME

(71) Applicant: Mitsubishi Aircraft Corporation, Aichi (JP)

(72) Inventors: Ichiro Maeda, Aichi (JP); Hirofumi Maeda, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 1676 days.

(21) Appl. No.: 13/740,693

(22) Filed: Jan. 14, 2013

(65) Prior Publication Data
US 2017/0197699 A1 Jul. 13, 2017

(30) Foreign Application Priority Data

Jan. 17, 2012 (JP) .................. 2012-006651

(51) Int. Cl.
*B64C 1/14* (2006.01)
*B64C 25/12* (2006.01)
*B64C 25/16* (2006.01)

(52) U.S. Cl.
CPC ............ *B64C 1/1407* (2013.01); *B64C 25/12* (2013.01); *B64C 25/16* (2013.01)

(58) Field of Classification Search
CPC ... B64C 1/1407; B64C 1/1476; B64C 23/005; B64C 25/12; B64C 25/16; B64C 2025/003
See application file for complete search history.

(56) References Cited

U.S. PATENT DOCUMENTS 2,388,365 A 11/1945 Palley
4,408,736 A * 10/1983 Kirschbaum ........... B64C 25/16
244/100 R
2004/0000094 A1 1/2004 Barbara et al.

FOREIGN PATENT DOCUMENTS

JP S63-72200 A 4/1988
JP 2004-050856 A 2/2004

OTHER PUBLICATIONS

Notice of Reason for Rejection for Patent Application No. JP 2012-006651, dated Aug. 26, 2015.

* cited by examiner

*Primary Examiner* — Nicholas McFall
(74) *Attorney, Agent, or Firm* — Pearne & Gordon LLP

(57) ABSTRACT

A fence 30A is installed on an inner surface 21a of a door 20A on the side which faces a landing gear bay 15, the fence 30A rising inwardly of the airframe from the inner surface 21a. When the door 20A opens outwardly of an airframe due to a pressure difference between the side of an outer surface 21c of the door 20A and the side of an inner surface 21a facing inner part of the landing gear bay 15 during a flight of an aircraft 10, the fence 30A closes a gap between the door 20A and an opening 15a of the landing gear bay 15, and thereby prevents air from flowing into the landing gear bay 15 through the gap.

20 Claims, 6 Drawing Sheets

PRIOR ART

DOOR OF AIRCRAFT AND AIRCRAFT HAVING THE SAME

BACKGROUND OF THE INVENTION

Field of the Invention

The present invention relates to an aircraft door installed in an airframe surface of an aircraft as well as to an aircraft having the aircraft door.

Description of the Related Art

A wheeled landing gear unit is widely used as landing gear of an aircraft. Some of such landing gear units are designed to be retractable into a landing gear bay installed in an airframe, being deployed outside the airframe from the landing gear bay only before use.

In some cases, such a retractable landing gear unit is equipped with a door which closes an opening of the landing gear bay in order to reduce air resistance while keeping the landing gear unit housed in the landing gear bay (see, for example, Japanese Patent Laid-Open No. 2004-50856).

The door is installed integrally with a leg body of the landing gear unit or installed on the side of the airframe. A base end portion of the landing gear unit is coupled turnably around a shaft installed on the airframe. A door 1 attached to the landing gear unit is designed to close an opening 3a of a landing gear bay 3 on the side of an airframe 2 as shown in FIG. 6A when the landing gear unit is retracted into the landing gear bay by turning around the shaft.

However, because of pressure changes near an outer surface of the airframe 2, a pressure difference occurs between the outer surface of the airframe 2 and the inside of landing gear bay 3 during flight. When the pressure near the outer surface of the airframe 2 is lower than the pressure inside the landing gear bay 3, due to a differential pressure between an outer surface 1a of the door 1 facing an outer side of the airframe 2 and an inner surface 1b of the door 1 facing an inner side of the landing gear bay 3, a force acts in the direction of opening the door 1 outward.

Consequently, as shown in FIG. 6B, if the door 1 opens outwardly of the airframe 2 due to its own elastic deformation or elastic deformation of the landing gear, the gap between an end portion 1f of the door 1 on a forward side of the airframe and the opening 3a increases, allowing air to flow into the landing gear bay 3. As a result, the pressure inside the landing gear bay 3 increases, further increasing the differential pressure between opposite sides of the door 1 and making the above problem conspicuous.

When the end portion 1f of the door 1 on the forward side of the airframe juts out from the airframe 2 in this way, air resistance increases, adversely affecting flight performance.

This problem is not limited to the door 1 of the landing gear unit, and can occur similarly with any door provided on an airframe surface of the aircraft.

The present invention has been accomplished in view of this technical problem and has an object to provide an aircraft door which can reduce deformation of a door outward of an airframe during flight as well as to provide an aircraft having the aircraft door.

SUMMARY OF THE INVENTION

The present invention made with this object is a door which closes an opening formed in an airframe surface of an aircraft, comprising: a door body openably/closably installed on the opening; and a fence installed at least on an outer periphery of the door body on a forward side of the airframe, the fence rising inwardly of the airframe from the door body.

When the door body opens outwardly of the airframe due to a differential pressure occurring between an outer side face of the door body facing outward of the airframe and an inner side face of the door body facing inward of the airframe during a flight of the aircraft, the fence can close a gap between the outer periphery of the door body and an outer periphery of the opening. This can prevent the door body from further opening outwardly of the airframe. A rise angle θ of the fence from an inner surface of the door body can be from 0 (exclusive) to 90°. This range can secure a height needed to effectively close the gap between the outer periphery of the door body and the outer periphery of the opening. More preferably the rise angle θ is from 40 to 70°.

The fence may be put up so as to be orthogonal to the inner side face of the door body, but preferably the fence is shaped to include a sloped portion sloping toward the forward side of the airframe from a base end portion to a front end portion, the base end portion being located on the side of the door body and the front end portion rising inwardly of the airframe. The sloped portion causes the fence to apply a force to the door body, pushing the door body inwardly of the airframe and thereby closing the door body inwardly of the airframe.

The door body may have any application as long as the door body is installed on the airframe surface. For example, the door body may be installed on a landing gear leg retractable into a landing gear bay installed in an airframe so as to close the landing gear bay.

Furthermore, the present invention may be an aircraft equipped with the aircraft door described above.

According to the present invention, when the door body deforms outwardly of the airframe due to a differential pressure occurring during the flight of the aircraft, the fence attached to the door body can close the gap between the outer periphery of the door body and the outer periphery of the opening and thereby prevent the door body from opening outwardly of the airframe.

Furthermore, if the fence has a sloped portion sloping toward the forward side of the airframe, the fence can apply a force to the door body, pushing the door body inward of the airframe and thereby closing the door body inward of the airframe.

DETAILED DESCRIPTION OF THE PREFERRED EMBODIMENTS

The present invention will be described in detail below with reference to embodiments shown in the accompanying drawings.

First Embodiment

Figure 1A:
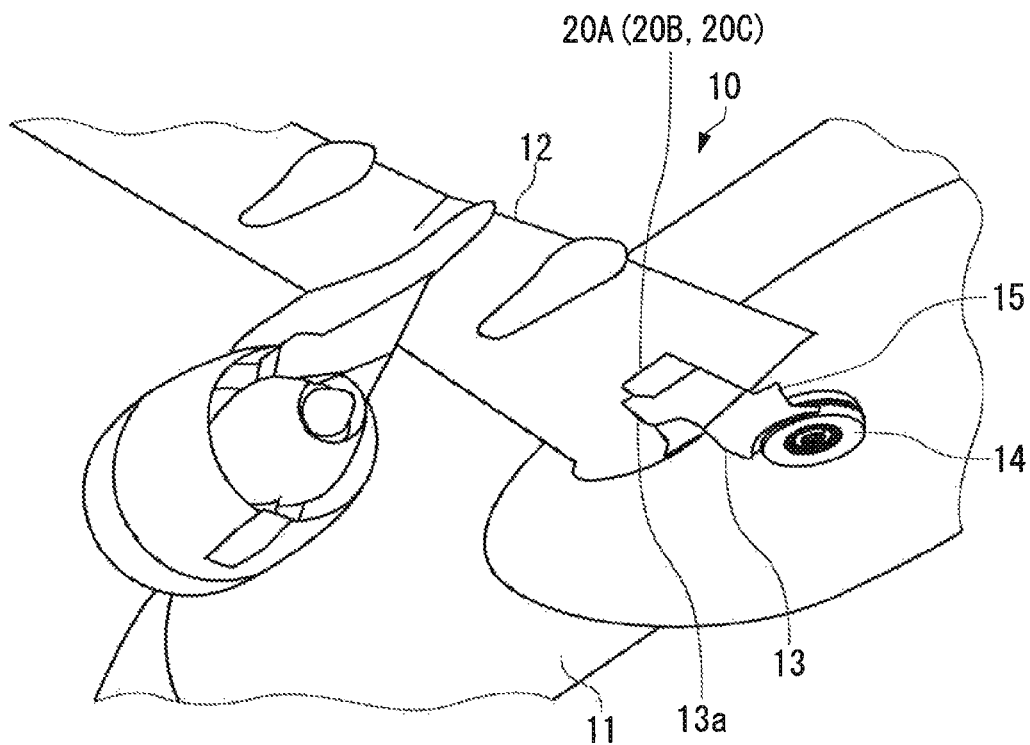
FIG. 1A is a perspective view showing a schematic configuration of an aircraft according to an embodiment of the present invention.

FIG. 1A is a diagram for illustrating an aircraft door according to an embodiment of the present invention and an aircraft having the aircraft door.

As shown in FIG. 1A, an aircraft 10 comprises main landing gear (landing gear, leg) 13 near a joint between a fuselage 11 and main wing 12.

Figure 1B:
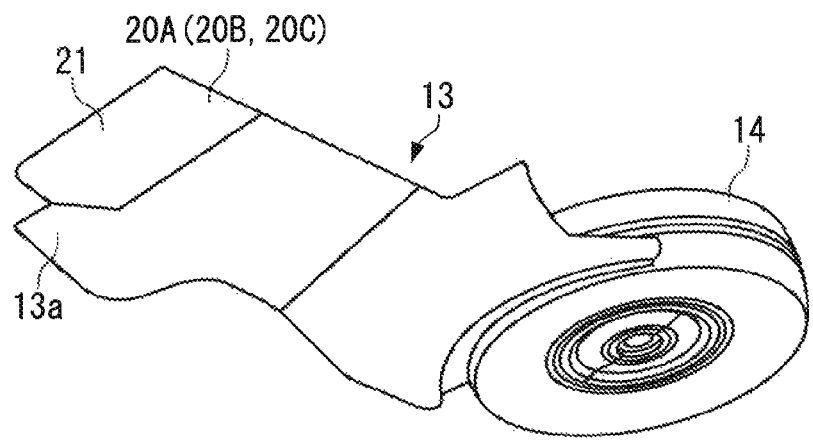
FIG. 1B is a perspective view of main landing gear.

On the side of its base end portion 13a, the main landing gear 13 is turnably coupled via a shaft (not shown) to a structural member installed in the main wing (FIGS. 1A and 1B). Also, on the side of its front end portion, the main landing gear 13 includes wheels 14 for taxiing.

The main landing gear 13 is retractable into a landing gear bay 15 formed running from the fuselage 11 to the main wing 12. Then, by a hydraulic cylinder unit (not shown), the main landing gear 13 is retracted into the landing gear bay 15 during flight and deployed from the landing gear bay 15 for takeoff and landing by turning around the shaft, with the wheels 14 placed downward.

Figure 2A:
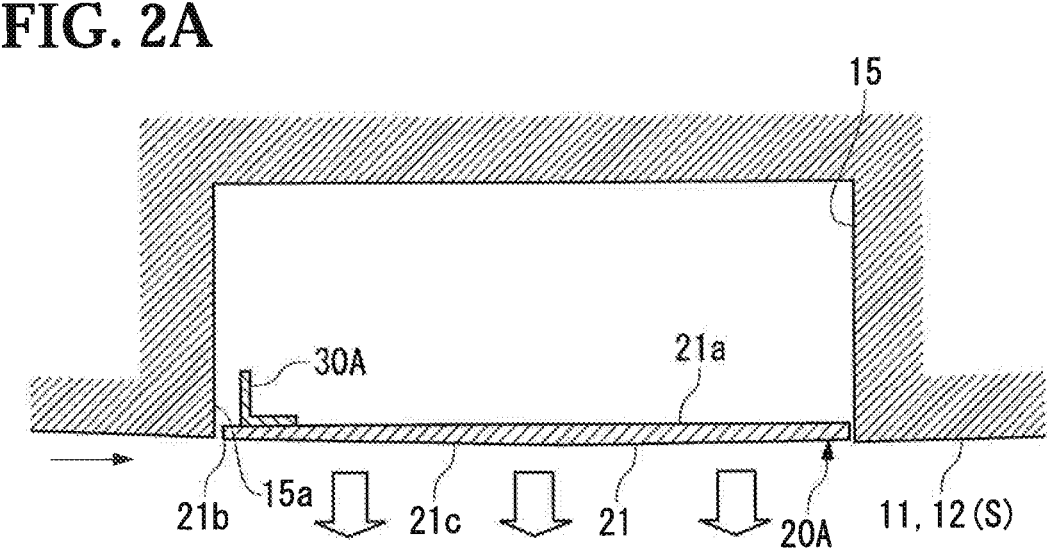
FIGS. 2A and 2B are sectional views showing a door installed on a landing gear bay for the main landing gear according to a first embodiment.

The main landing gear 13 configured as described above is equipped integrally with a door 20A adapted to close part of an opening 15a of the landing gear bay 15 as shown in FIG. 2A while the main landing gear 13 is stored in the landing gear bay 15.

A door body 21 of the door 20A is panel-shaped and provided with an outer peripheral shape which conforms to the shape of the opening 15a of the landing gear bay 15.

Figure 2B:
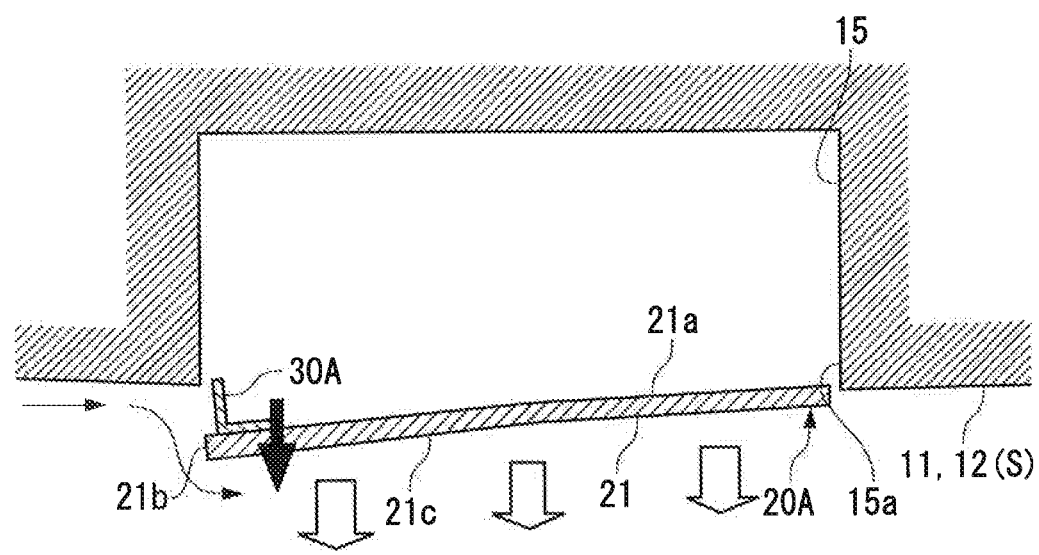

The door body 21 configured as described above is equipped with a fence 30A which rises inwardly of the airframe from the door body 21. FIGS. 2A and 2B show an example in which the fence 30A is installed on an inner surface 21a of the door body 21 on the side which faces the landing gear bay 15, the fence 30A rising in an orthogonal direction from the inner surface 21a. The fence 30A is installed at least on an end portion of the door body 21 on the forward side of the airframe.

Figure 3:
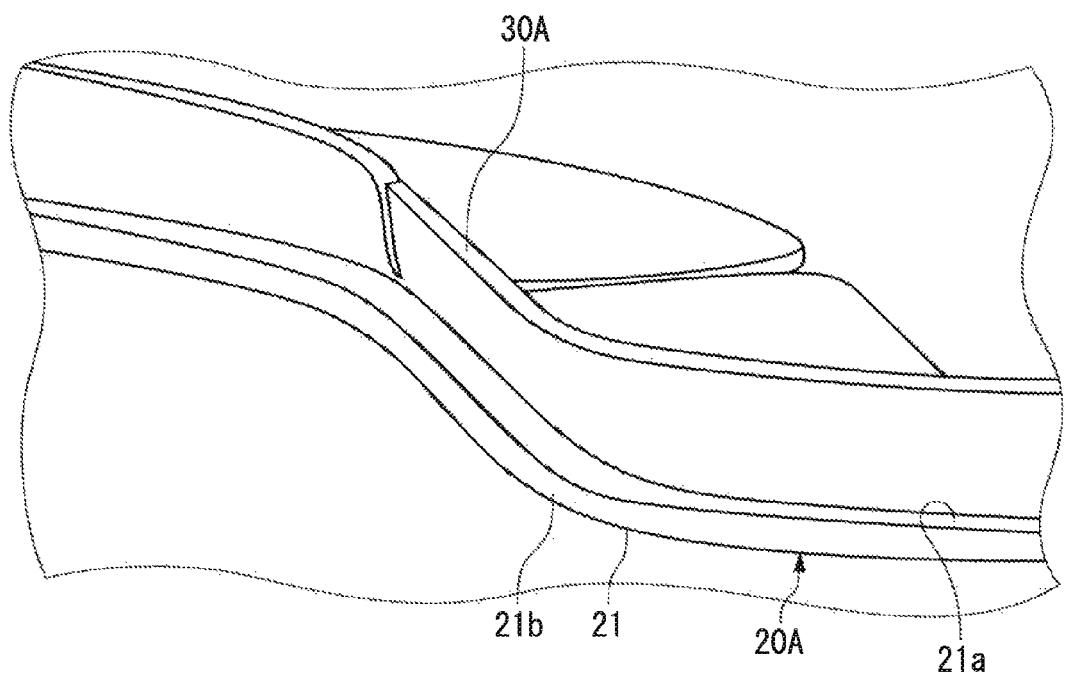
FIG. 3 is a perspective view showing part of a door having a fence.

As shown in FIG. 3, the fence 30A is installed continuously in a circumferential direction along an outer periphery 21b of the door body 21. Height of the fence 30A can be set appropriately in advance according to relative displacement between the fuselage 11 and door body 21, an amount of deformation of the door body 21, and the like. Incidentally, the relative displacement between the fuselage 11 and door body 21 varies with aerodynamic forces acting on the door body 21 as well as with rigidity of the door body 21 including a door mount, where the aerodynamic forces and rigidity are inherent to the airframe.

As shown in FIG. 2A, during the flight of the aircraft 10, the door 20A undergoes changes in pressure near the outer surface 21c of the door body 21 facing an outer side of the airframe. Consequently, a pressure difference occurs between the side of the outer surface 21c of the door body 21 and the side of the inner surface 21a facing inner part of the landing gear bay 15. When the pressure on the side of the outer surface 21c falls below the pressure on the side of the inner surface 21a, a force directed from inside to outside the airframe acts on the door body 21.

As shown in FIG. 2B, when the door body 21 opens outwardly of the airframe by this force, the outer periphery 21b of the door body 21 protrudes outward from surfaces S of the main wing 12 and fuselage 11 around the door body 21. In the protruding part, the fence 30A, which is located on the side of the inner surface 21a of the door body 21, closes the gap between the door body 21 and opening 15a of the landing gear bay 15, preventing air from flowing into the landing gear bay 15 through the gap. This prevents the door body 21 from opening further outwardly of the airframe due to increased pressure to be caused by air flowing into the landing gear bay 15. The durability and quality of the door 20A can be improved in this way.

Furthermore, the fence 30A placed on the inner surface 21a of the door body 21 reinforces the door body 21, reducing elastic deformation more efficiently. This also makes it possible to reduce the thickness of the door body 21, resulting in reduced weight.

Moreover, the fence 30A has a simplified configuration, offering the above effects at low cost.

The fence 30A can be formed, for example, from metal material such as aluminum alloy or stainless steel, CFRP (carbon fiber reinforced plastic), GFRP (glass fiber reinforced plastics), or the like.

Second Embodiment

Next, an aircraft door according to a second embodiment of the present invention and an aircraft having the aircraft door will be described. In the following description, only a fence 30B differs from the first embodiment described above and the rest of the configuration is in common with the first embodiment. Therefore, common components with the first embodiment described above are denoted by the same reference numerals as the corresponding components in the first embodiment, and description thereof will be omitted.

Figure 4:
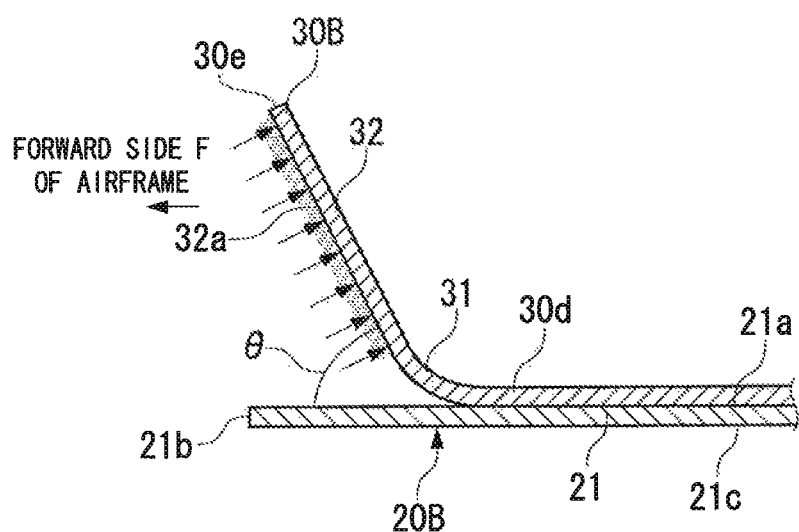
FIG. 4 is a sectional view showing a configuration of a fence according to a second embodiment.

As shown in FIG. 4, the fence 30B rising from the inner surface 21a of the door body 21 is installed on the door body 21 of the door 20B. The fence 30B is installed, sloping toward an F side of the airframe forward side from a base end portion 30d on the side of the inner surface 21a of the door body 21 toward a front end portion 30e. The fence 30B includes a bent portion 31, formed into a predetermined shape, in the base end portion 30d, and a flat plate portion (sloped portion) 32 is formed, running from the bent portion 31 to the front end portion 30e.

The flat plate portion 32 of the fence 30B is formed such that its rise angle $\theta$ from the inner surface 21a of the door body 21 will be an acute angle.

If the rise angle $\theta$ is too small, the gap between the door body 21 and opening 15a of the landing gear bay 15 cannot be closed effectively. If the rise angle $\theta$ is too large or too small, a function to correct deformation of the door body 21 is impaired. Thus, for the flat plate portion 32 of the fence 30B, a preferable rise angle $\theta$ is 40 to 70°. In this range, the function to correct the deformation of the door body 21 is enhanced and the gap between the door body 21 and the opening 15a of the landing gear bay 15 can be closed effectively.

The door 20B equipped with the fence 30B configured as described above can prevent air from flowing into the landing gear bay 15 through the gap between the door body 21 and the opening 15a of the landing gear bay 15, as with the above embodiment. This makes it possible to prevent deformation of the door body 21 and improves the durability and quality of the door body 21.

Since the fence 30B of the door body 21 is sloped, air hits a surface 32a of the flat plate portion 32 of the fence 30B on the forward side F of the airframe, creating a positive pressure. Consequently, a force acts on the flat plate portion 32 of the fence 30B, tending to push the flat plate portion 32 in a direction orthogonal to the surface 32a of the flat plate portion 32. A component of the force acts on the door body 21 from the fence 30B, as a force to restore the door body 21 deformed outwardly of the airframe. This makes it possible to prevent the door body 21 from further deforming outwardly of the airframe as well as to reduce the amount of deformation of the door body 21.

Still Other Embodiments

Figure 5:
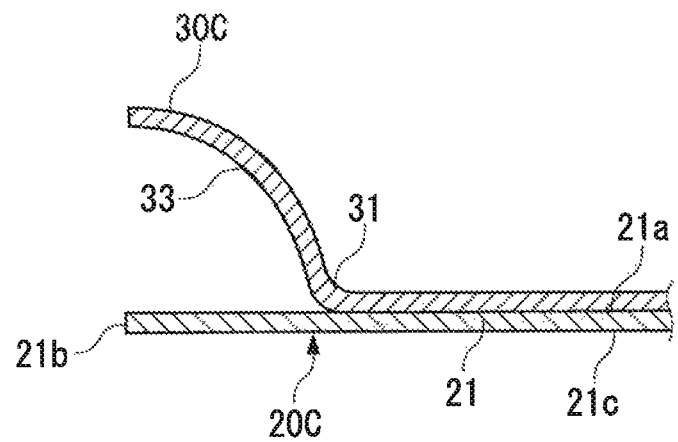
FIG. 5 is a sectional view showing a variation of the fence.
Figure 6A:
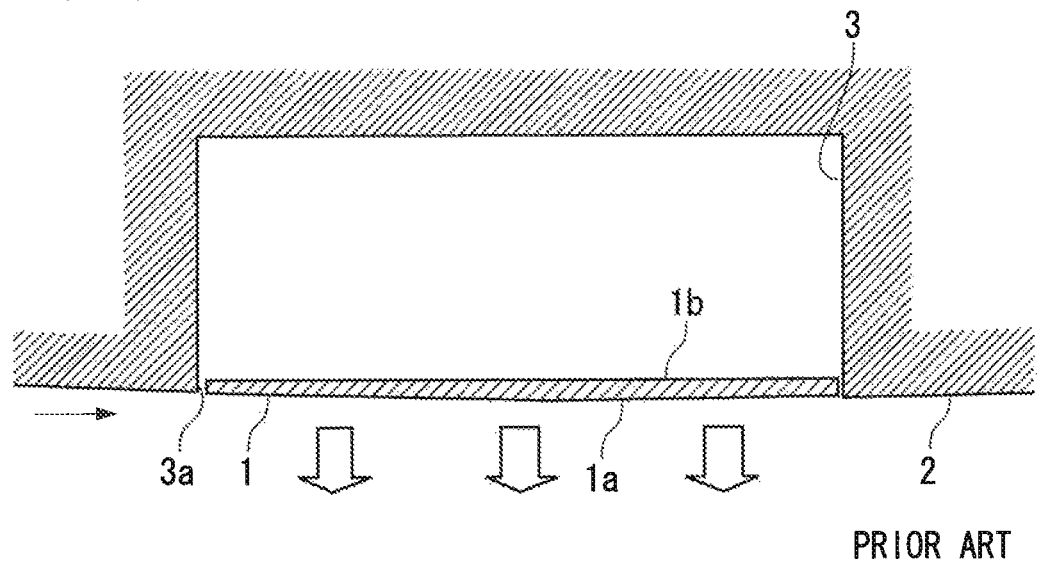
FIGS. 6A and 6B are sectional views showing a conventional door installed on a landing gear bay for the main landing gear.
Figure 6B:
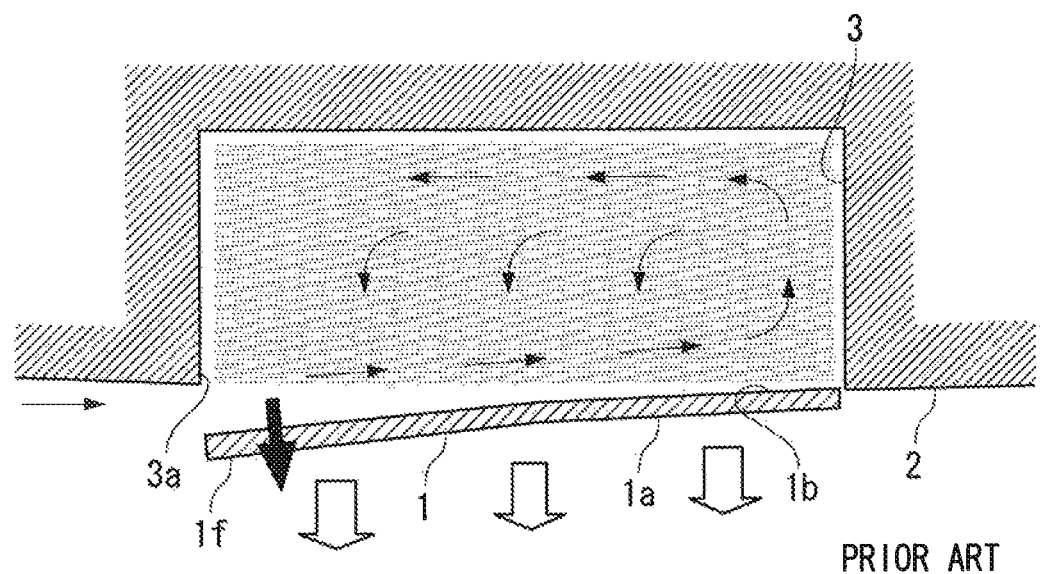

According to the second embodiment described above, the fence 30B has the flat plate portion 32. Instead of the flat plate portion 32, a fence 30C may have a curved plate portion (sloped portion) 33 as shown in FIG. 5. That is, in FIG. 5, a door 20C has the fence 30C with the curved plate portion 33. The curved plate portion 33 is curved convexly toward the rear part of the airframe.

Consequently, the curved plate portion 33 can more actively catch the air flowing in through the gap between the door body 21 and the opening 15a of the landing gear bay 15. Thereby, the force acting on the door body 21 from the fence 30C is increased to restore the door body 21 deformed outwardly of the airframe. This provides a more pronounced effect than the second embodiment described above.

Besides, instead of being mounted on the side of an inner peripheral surface of the door body 21, the fence 30A, 30B, or 30C of the shape illustrated above may be formed continuously and integrally with the outer periphery of the door body 21. That is, the outer periphery of the door body 21 may be formed into a shape similar to the shape of the fence 30A, 30B, or 30C by bending.

Also, although in the example described above, the fence 30A, 30B, or 30C is installed on the outer periphery of the door body 21 on the forward side of the airframe, in addition to the outer periphery described above, the fence 30A, 30B, or 30C may be installed in another location (e.g., on the outer periphery of the door body 21 on the rearward side of the airframe) as well.

Also, configurations similar to those described above can be applied not only to the doors 20A, 20B, and 20C for the main landing gear 13, but also to doors and lids of various uses installed on the airframe of the aircraft 10. Depending on mounting locations of the doors and lids, the fence 30A, 30B, or 30C may be installed at a location other than on the outer periphery of the door body 21 on the forward side of the airframe. Alternatively, the fence 30A, 30B, or 30C may be installed around the entire periphery of the door body 21.

Besides, some of the components cited in the above embodiments may be left out or changed as appropriate without departing from the gist of the present invention.

DESCRIPTION OF SYMBOLS

10 Aircraft
11 Fuselage
12 Main wing
13 Main landing gear (landing gear, leg)
14 Wheel
15 Landing gear bay
15a Opening
20A, 20B, 20C Door
21 Door body
21a Inner surface
21b Outer periphery
21c Outer surface
30A, 30B, 30C Fence
31 Bent portion
32 Flat plate portion (sloped portion)
33 Curved plate portion (sloped portion)

What is claimed is:

1. An aircraft door which closes an opening formed in an airframe surface of an aircraft, comprising:
   a door body installed on the opening, the door body being movable between an open position and a closed position; and
   a fence installed at least on an outer periphery portion of the door body that faces a forward side of the airframe, the fence rising inwardly of the airframe from the door body,
   wherein when the door body opens outwardly of the airframe due to a differential pressure occurring between an outer side face of the door body facing outward of the airframe and an inner side face of the door body facing inward of the airframe during a flight of the aircraft, the fence closes a gap between an outer periphery of the opening and the outer periphery portion of the door body facing the forward side of the airframe.

2. The aircraft door according to claim 1, wherein the fence includes a sloped portion sloping toward the forward side of the airframe from a base end portion to a front end portion, the base end portion being located on the side of the door body and the front end portion rising inwardly of the airframe.

3. The aircraft door according to claim 1, wherein the fence is installed on the inner side face of the door body.

4. The aircraft door according to claim 3, wherein the fence rises from the inner side face of the door body in an orthogonal direction.

5. The aircraft door according to claim 3, wherein the fence includes a curved plate portion curved convexly toward a rear part of the airframe.

6. The aircraft door according to claim 1, wherein the door body is installed on a landing gear leg retractable into a landing gear bay installed in an airframe so as to close the landing gear bay.

7. An aircraft having the aircraft door according to claim 1.

8. The aircraft door according to claim 1, wherein the fence extends along the outer periphery portion of the door body that faces a forward side of the airframe.

9. An aircraft door which closes an opening formed in an airframe surface of an aircraft, comprising:
   a door body installed on the opening, the door body being movable between an open position and a closed position; and
   a fence installed at least on an outer periphery portion of the door body that faces a forward side of the airframe, the fence rising inwardly of the airframe from the door body,
   wherein the fence is a flat plate that extends along the outer periphery portion of the door body facing the forward side of the airframe.

10. The aircraft door according to claim 9, wherein when the door body opens outwardly of the airframe due to a differential pressure occurring between an outer side face of the door body facing outward of the airframe and an inner side face of the door body facing inward of the airframe during a flight of the aircraft, the fence closes a gap between an outer periphery of the opening and the outer periphery portion of the door body facing the forward side of the airframe.

11. The aircraft door according to claim 9, wherein the flat plate includes first and second surfaces that are sloped toward the forward side of the airframe from a base end portion to a front end portion, the base end portion being located on the an inner side face of the door body and the front end portion rising inwardly of the airframe.

12. The aircraft door according to claim 9, wherein the fence is installed on an inner side face of the door body.

13. The aircraft door according to claim 9, wherein the fence rises from an inner side face of the door body in an orthogonal direction.

14. The aircraft door according to claim 9, wherein the door body is installed on a landing gear leg retractable into a landing gear bay installed in an airframe so as to close the landing gear bay.

15. An aircraft having the aircraft door according to claim 9.

16. The aircraft door according to claim 9, wherein the flat plate is oriented such that a rise angle between the flat plate and an inner surface of the door body is an acute angle.

17. An aircraft door which closes an opening formed in an airframe surface of an aircraft, comprising:

a door body installed on the opening, the door body being movable between an open position and a closed position; and a fence installed at least on an outer periphery portion of the door body that faces a forward side of the airframe, the fence rising inwardly of the airframe from the door body, wherein the fence includes a curved plate portion curved convexly toward a rear part of the airframe.

18. The aircraft door according to claim 17, wherein when the door body opens outwardly of the airframe due to a differential pressure occurring between an outer side face of the door body facing outward of the airframe and an inner side face of the door body facing inward of the airframe during a flight of the aircraft, the fence closes a gap between an outer periphery of the opening and the outer periphery portion of the door body facing the forward side of the airframe.

19. The aircraft door according to claim 17, wherein the fence is installed on the inner side face of the door body.

20. An aircraft having the aircraft door according to claim 17.

* * * * *

UNITED STATES PATENT AND TRADEMARK OFFICE
CERTIFICATE OF CORRECTION

PATENT NO. : 9,957,033 B2
APPLICATION NO. : 13/740693
DATED : May 1, 2018
INVENTOR(S) : Ichiro Maeda et al.

Page 1 of 1

It is certified that error appears in the above-identified patent and that said Letters Patent is hereby corrected as shown below:

In the Specification

Column 3, Line 18, "wing (FIGS. 1A and 1B)" should be -- wing 12 (FIGS. 1A and 1B) --.

In the Claims

Column 7, Line 5, "located on the an inner side face" should be -- located on an inner side face --.

Signed and Sealed this
Tenth Day of July, 2018

Andrei Iancu
*Director of the United States Patent and Trademark Office*